United States Patent
Sung et al.

(10) Patent No.: US 9,739,309 B2
(45) Date of Patent: Aug. 22, 2017

(54) ACTIVE COMPENSATING HYDROSTATIC BEARING AND REGULATOR

(71) Applicant: NATIONAL TSING HUA UNIVERSITY, Hsinchu (TW)

(72) Inventors: Cheng-Kuo Sung, Hsinchu (TW); Yi-Chen Wang, Taichung (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 103 days.

(21) Appl. No.: 14/934,163

(22) Filed: Nov. 6, 2015

(65) Prior Publication Data

US 2017/0051789 A1    Feb. 23, 2017

(30) Foreign Application Priority Data

Aug. 20, 2015   (TW) .............................. 104127206 A

(51) Int. Cl.
   *F16C 32/06*   (2006.01)
(52) U.S. Cl.
   CPC ................................ *F16C 32/0651* (2013.01)
(58) Field of Classification Search
   CPC .. F16C 32/06; F16C 32/0614; F16C 32/0618; F16C 32/0622; F16C 32/0625; F16C 32/0629; F16C 32/0633; F16C 32/0644; F16C 32/0648; F16C 32/0651; F16C 32/0655; F16C 32/0659
   See application file for complete search history.

(56) References Cited

U.S. PATENT DOCUMENTS

| | | | |
|---|---|---|---|
| 4,560,213 A * | 12/1985 | Enderle ............... | F16C 32/0603 384/12 |
| 5,819,328 A | 10/1998 | Lewis | |
| 6,076,548 A * | 6/2000 | Schonfeld ........... | F16C 32/0648 137/501 |
| 6,474,867 B1 * | 11/2002 | Perrone, Jr. ............. | F16C 32/06 384/12 |
| 7,008,111 B2 | 3/2006 | Hamke | |
| 8,333,512 B2 * | 12/2012 | Huang .................. | F16C 29/025 384/12 |
| 8,556,509 B2 | 10/2013 | Sung et al. | |

FOREIGN PATENT DOCUMENTS

| | | |
|---|---|---|
| CN | 1037992 C | 4/1998 |
| JP | 2012117659 A | 6/2012 |
| TW | 201040406 A | 11/2010 |
| WO | 9825039 A1 | 6/1998 |

* cited by examiner

*Primary Examiner* — Phillip A Johnson
(74) *Attorney, Agent, or Firm* — CKC & Partners Co., Ltd.

(57) ABSTRACT

The present disclosure discloses an active compensating hydrostatic bearing which includes a body, a mass block and a elastic member. The body includes a compensation hole and holds the mass block and the elastic member inside. The elastic member is put between the mass block and the compensation hole for generating a compensation gap near the compensation hole. By resisting the compression from the mass block, the elastic member can control the compression of the compensating gap so as to stabilize the rigidity of the bearing.

37 Claims, 10 Drawing Sheets

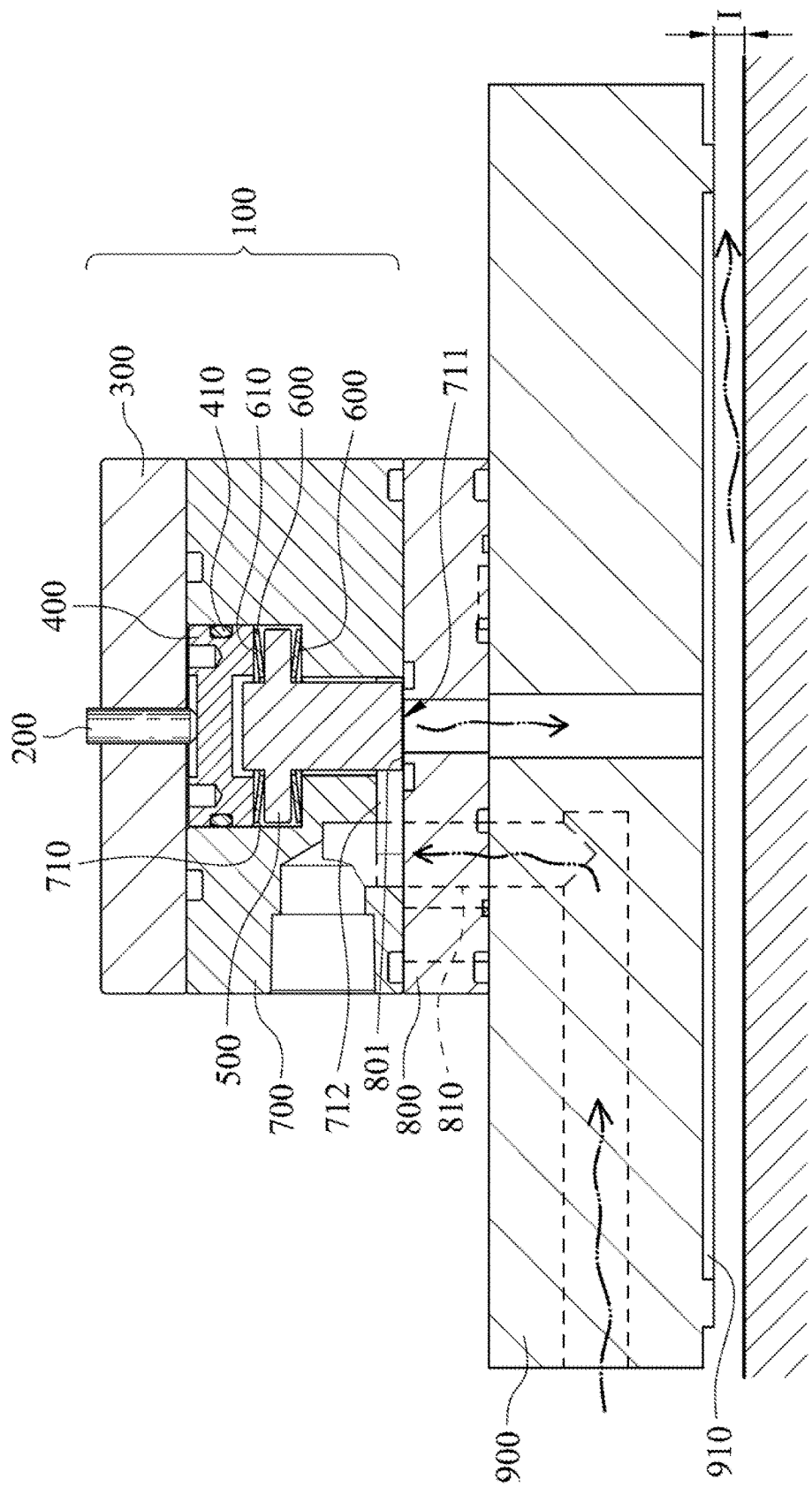

ACTIVE COMPENSATING HYDROSTATIC BEARING AND REGULATOR

RELATED APPLICATIONS

This application claims priority to Taiwan Application Ser. No. 104127206, filed Aug. 20, 2015, which is herein incorporated by reference.

BACKGROUND

Technical Field

The present disclosure relates to a compensating hydrostatic bearing and regulator. More particularly, the present disclosure relates to an active compensating hydrostatic bearing and regulator.

Description of Related Art

Hydrostatic bearings play important roles in the precision manufacturing industry, such as automatic robotic arm, cutting machine, high speed machining tool and even astronomical telescope or wind generator. Excellent performances on mechanism locating, anti-vibration and high machining precision has made hydrostatic bearing a critical technology in the industry.

Hydrostatic bearings can be categorized by compensating types, such as constant pressure type or active compensating type. The constant pressure hydrostatic bearing is simpler so that can reduce the cost, but the response to an external loading is invariable since the flow resistance of the bearing is always constant, the characteristic causes the response to the external compression unfavorable.

The active compensating hydrostatic bearing can change the response to an external loading by adjusting the structure in short time for changing the inner pressure of the bearing, so that to overcome the disadvantage of the constant pressure hydrostatic bearing.

However, there are some problems need to be solved: to improve the response to an external loading, the active compensating hydrostatic bearing must adjust the inner pressure precisely and synchronously. That is, whether the inner pressure be adjusted properly or not will decide the properties of the active compensating hydrostatic bearing.

The active compensating hydrostatic bearing in prior art uses the external regulator to compensate the response according to an external loading, but this makes the compensation delayed because compensation liquid can't be input to or output from the bearing instantly. The asynchronous compensation causes the active compensating hydrostatic bearing in prior art poor to response to variable an external loading.

Another problem is that the accuracy of the active compensating hydrostatic bearing is demanding so parts in the bearing are usually combined together to avoid accumulated discrepancy. However, the manner is harmful to replace each of parts because all parts will be replaced wholly when anyone of them is fail, so the cost of the active compensating hydrostatic bearing stays high. And even so, it is still difficult to solve the problem of tolerance of each part fully.

Moreover, since the inner pressure of the active compensating hydrostatic bearing is changed according to an external loading, if the bearing is lack of buffer mechanism, the amplitude of compensating parts will be increased during adjusting the flow resistance. This leads the rigidity of bearing to decrease quickly with the rising loading and inferior stability.

SUMMARY

According to an embodiment of the present disclosure, an active compensating hydrostatic regulator includes a body, a mass block and at least one elastic member. The body includes a sink which has a compensation hole. The mass block is disposed in the sink. The elastic member is disposed between the mass block and the compensation hole, the mass block and the compensation hole are departed by the elastic member thereby forming a compensation gap therebetween. The elastic member withstands the mass block when the mass block is compressed to narrow the compensation gap.

According to another embodiment of the present disclosure, an active compensating hydrostatic bearing includes a body, a mass block, at least one elastic member and a valve. The body includes a sink which has a compensation hole. The mass block is disposed in the sink. The elastic member is disposed between the mass block and the sink, and the elastic member separates the mass block and the compensation hole by a compensation gap. The elastic member withstands the mass block when the mass block is compressed to narrow the compensation gap. The valve is adjacent to the body and having an infusion hole interconnected with the compensation hole, and the valve infuses compensation liquid into the sink via the infusion hole directly or indirectly.

According to still another embodiment of the present disclosure, an active compensating hydrostatic regulator applying for an active compensating hydrostatic bearing includes a compensation hole, a valve and a damping means. The compensation hole is disposed on the active compensating hydrostatic regulator. The valve includes an infusion hole and a compensation channel. The damping means withstands the external force applied to the active compensating hydrostatic regulator. The valve includes an infusion hole and a compensation channel. The infusion hole is interconnected with the compensation hole. The compensation channel is interconnected with the infusion hole.

BRIEF DESCRIPTION OF THE DRAWINGS

The disclosure can be more fully understood by reading the following detailed description of the embodiment, with reference made to the accompanying drawings as follows:

FIG. 2 is a cross-sectional view of front of the active compensating hydrostatic bearing of FIG. 1;

DETAILED DESCRIPTION

Figure 1:
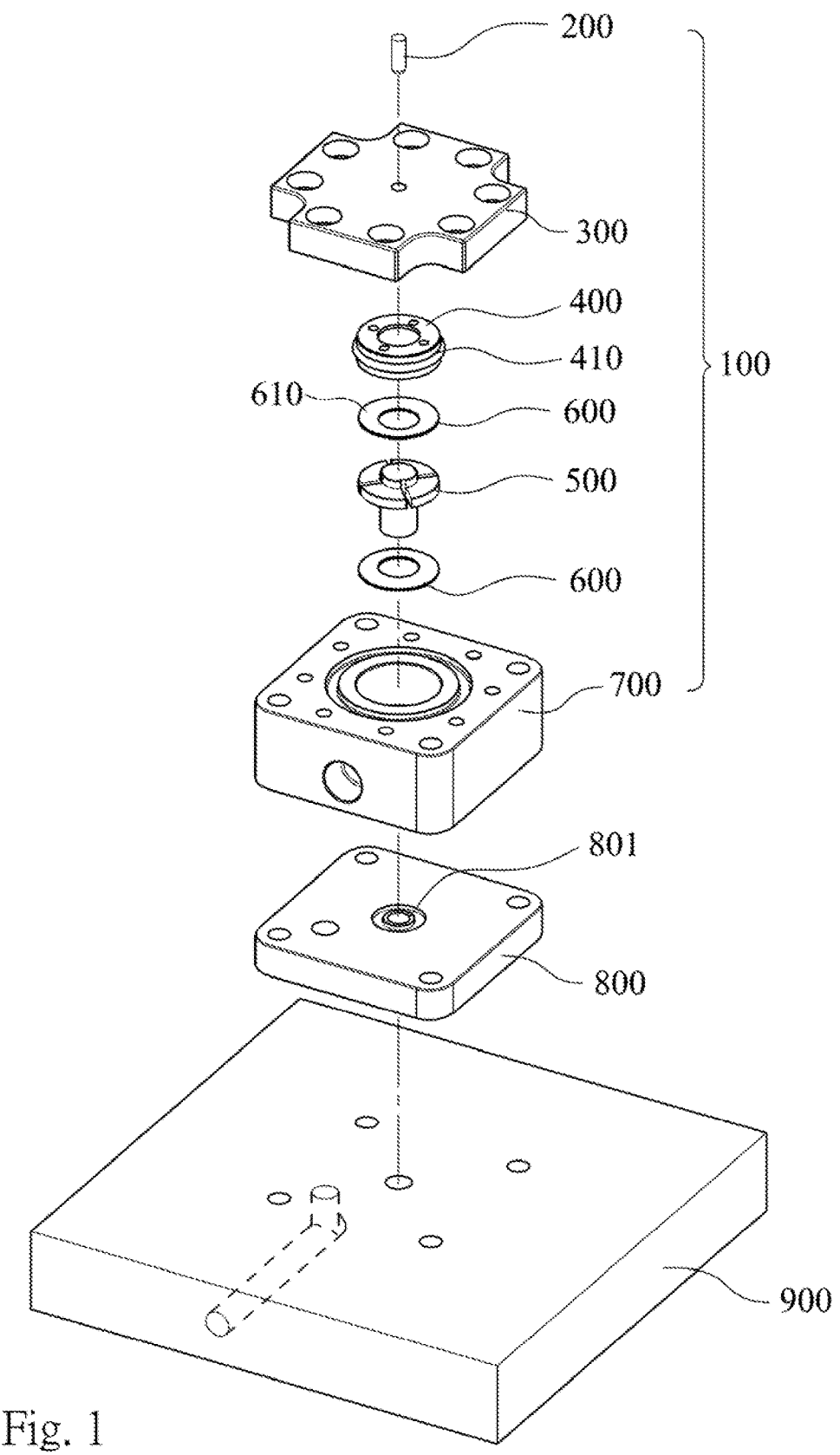
FIG. 1 is an exploded view of an active compensating hydrostatic bearing according to one embodiment of the present disclosure.

FIG. 1 is an exploded view of an active compensating hydrostatic bearing according to one embodiment of the present disclosure. FIG. 2 is a cross-sectional view of front of the active compensating hydrostatic bearing of FIG. 1. In FIG. 1, the active compensating hydrostatic bearing includes an active compensating hydrostatic regulator 100, a valve 800 and a pad 900 concatenated from top to bottom sequentially.

The active compensating hydrostatic regulator 100 includes an adjusting member 200, a lid 300, a load member 400, a mass block 500, two elastic members 600 and a body 700. The lid 300 covers on the body 700 and includes a through hole for passing through the adjusting member 200. The load member 400 and the mass block 500 are accommodated in a sink 710 of the body 700 and the adjusting member 200 passes through the through hole and abuts the load member 400.

In FIG. 2, center of the elastic members 600 are hollow, and the elastic members 600 sleeve on the mass block 500 which is cross-shaped in section. The two elastic members 600 are disposed between the load member 400 and the mass block 500, and between the mass block 500 and the sink 710 respectively.

The load member 400 can include a ring 410 disposed therethrough. In one example, the ring 410 can be an O-ring made of rubber, and the O-ring is bound on the outer edge of the load member 400. In FIG. 2, normally, a passageway on the left side of the body 700 is controlled to be closed. Sensors that capable of measuring temperature and pressure of the sink 710 can be disposed in the passageway, or a capillary restriction can be disposed in the passageway when the flow rate of the active compensating hydrostatic regulator 100 is lower than normal condition.

Figure 7:
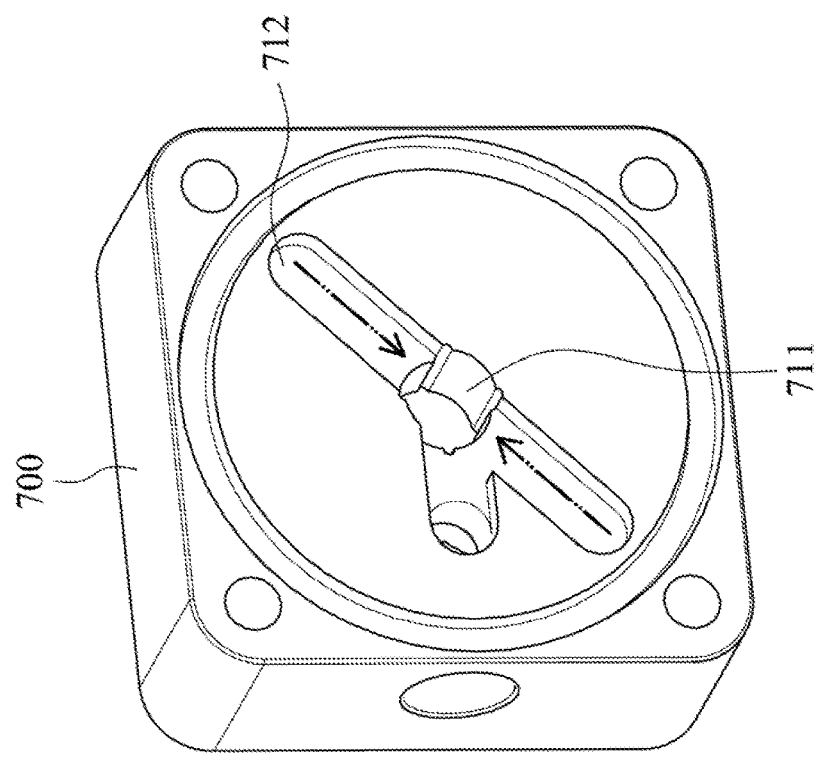
FIG. 7 is a schematic view of the bottom of the body of the active compensating hydrostatic bearing of FIG. 1.
Figure 6:
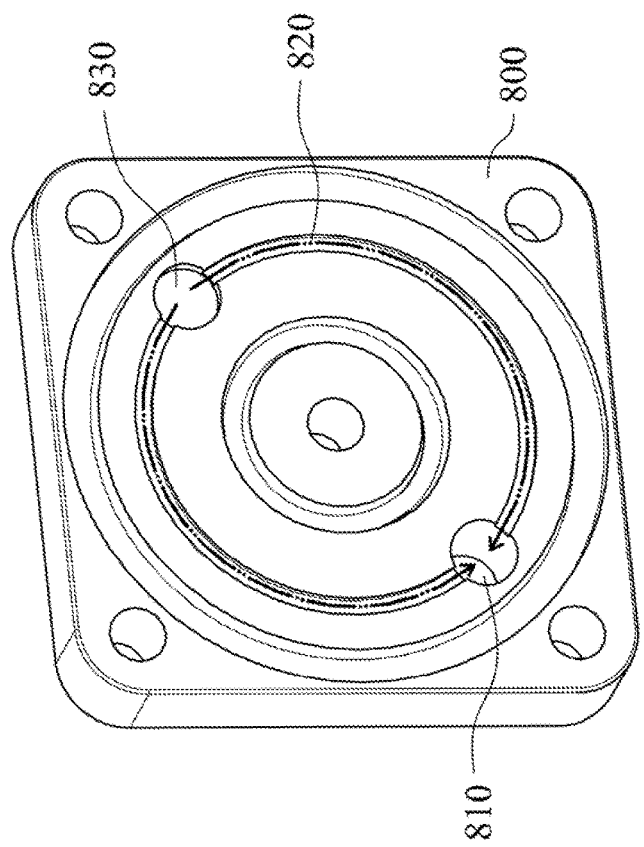
FIG. 6 is a schematic view of the compensation channel of the active compensating hydrostatic bearing of FIG. 1.
Figure 8:
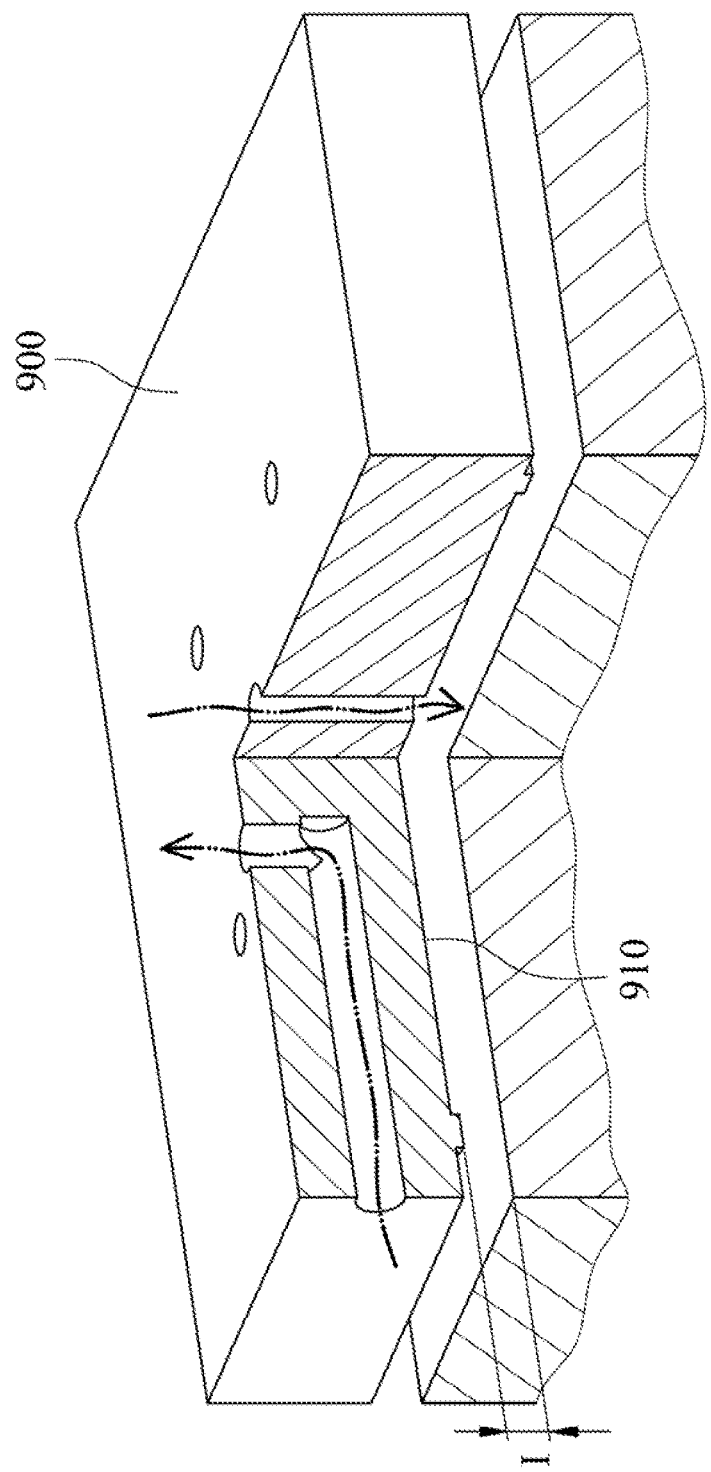
FIG. 8 is a cross-sectional perspective view of the pad of the active compensating hydrostatic bearing of FIG. 1.

To explain the structure of the body 700 in detail, please refer to FIG. 6, FIG. 7 and FIG. 8. In FIG. 7, a compensation hole 711 and an infusion channel 712 are disposed at the bottom of the body 700. The compensation hole 711 and the infusion channel 712 are interconnected with each other in the form of Y-shape. The shorter branch interconnects with the mentioned passageway so that temperature and pressure of the sink 710 can be measured.

FIG. 6 shows an adjacent surface of the valve 800 and the body 700, the valve 800 includes a seal surface 801 and an infusion hole 810 near the mentioned adjacent surface. As shown in FIG. 7, the infusion hole 810 aligns the infusion channel 712 of the body 700 to make compensation liquid be infused into the sink 710 of the body 700 via the infusion hole 810 and the infusion channel 712.

In FIG. 8, the pad 900 under the valve 800 can infuse compensation liquid into the valve 800 via the path, and the pad 900 has a chamber 910 for interconnecting with the external compensation liquid system via an interstice I at the bottom.

In detail, compensation liquid is infused into the pad 900 form the broadside, and then flows through the infusion hole 810, the infusion channel 712 and the sink 710.

In FIG. 2, since the compensation hole 711 of the sink 710 interconnects with the chamber 910, and the sink 710 is closed at the lid 300 by the load member 400 and the ring 410, compensation liquid will be discharged downward to the interstice I of the chamber 910 when the inner pressure of the sink 710 raises.

Figure 3A:
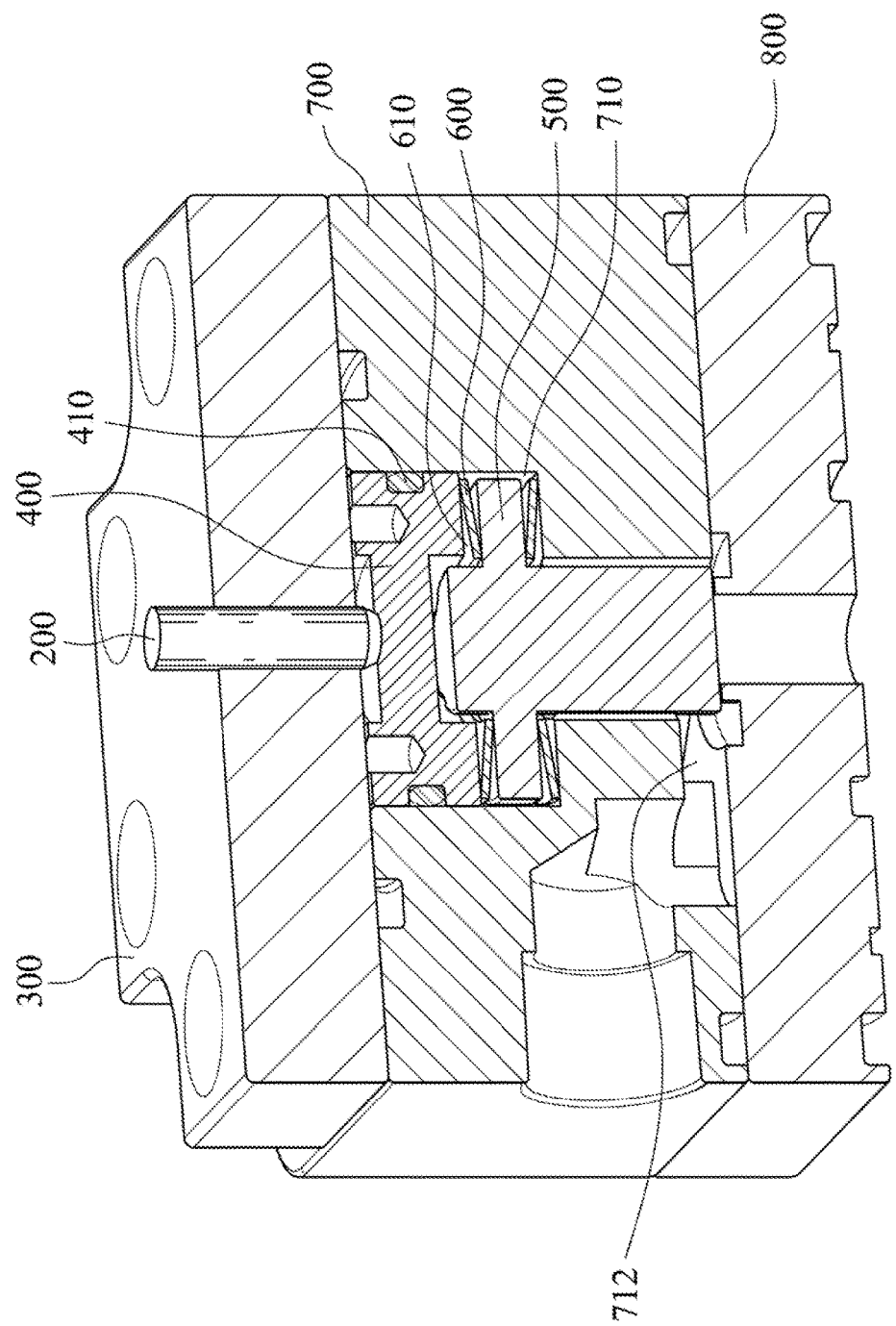
FIG. 3A is a cross-sectional perspective view of the active compensating hydrostatic bearing of FIG. 1.

FIG. 3A is a cross-sectional perspective view of the active compensating hydrostatic bearing of FIG. 1. In FIG. 3A, because the elastic member 600 on top withstands the load member 400 and the mass block 500, the mass block 500 can be controlled only by the elastic member 600 and without moving caused by the pressure from the load member 400.

The elastic member 600 is disk-shaped and made of S45C steel. Each of the elastic members 600 includes a disk surface 610, and the two disk surfaces 610 face forward the load member 400 and the compensation hole 711 respectively for deforming to respond to the external pressure.

Figure 3B:
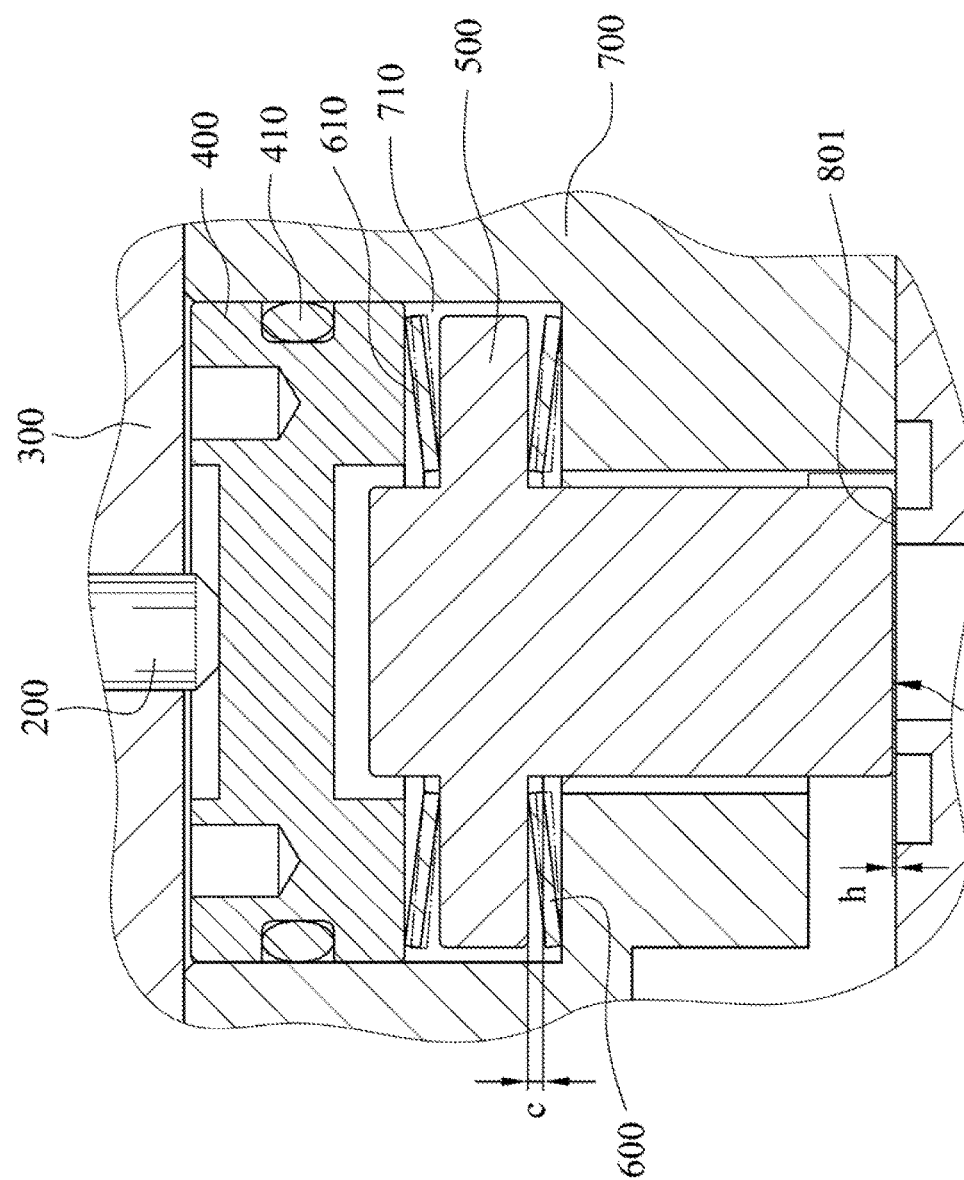
FIG. 3B is a schematic view of the elastic member of the active compensating hydrostatic bearing of FIG. 1.

FIG. 3B is a schematic view of the elastic member 600 of the active compensating hydrostatic bearing of FIG. 1. In FIG. 3B, each of the elastic members 600 has an initial compression C which can be adjusted by the adjusting member 200 to change the rigidity of the elastic members 600, such as using the socket set screws. Moreover, the initial compression C can be smaller than 0.2 mm, in the range of the compression, the deformation of the elastic members 600 are proportional to the loading, that is, the rigidity of the elastic members 600 are constant. For demand to the variable rigidity of bearing, the initial compression C can be adjusted out of the mentioned range.

Besides, two of the elastic members 600 can be different sizes to change its characteristic of rigidity. The detail of technique for variable rigidity is related to mechanical knowledge and analysis method, so will not state herein.

The compensation principle of the active compensating hydrostatic regulator 100 is as follows: the mass block 500 and the seal surface 801 are separated by a compensation gap h, when the bearing is influenced by an external loading, the elastic members 600 deform and cause the compensation gap h narrowed to rise flow resistance of compensation liquid goes through the compensation hole 711. Therefore, the bearing can against an external loading with the mentioned flow resistance grows proportionally under the fixed flow rate of compensation liquid. The abovementioned principle is basic knowledge of active compensating hydrostatic bearing, and will not describe in detail herein.

Because the inner pressure of the sink 710 rise, the mass block 500 will be pushed up, this makes the compensation gap h and the initial compression C greater than the beginning. After that that the inner pressure of the sink 710 decreases with the dropping flow resistance, thereby adjusting the compensation gap h repeatedly to balance an external loading.

For the active compensating hydrostatic regulator 100, the elastic members 600 in disk-shaped can be regarded as a heavy damping system. The presence of the initial compression C coupled with isolation between the mass block 500 and the load member 400, members in the sink 710 will not collide each other. Moreover, the disposition is helpful to stabilize the response to an external loading.

Figure 4C:
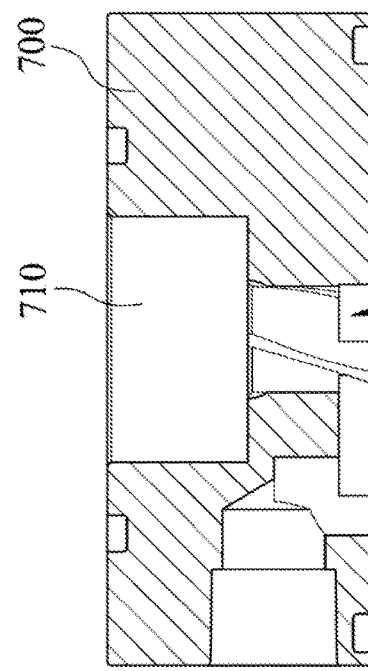
FIG. 4C is a schematic view of one embodiment of the body of the active compensating hydrostatic bearing of FIG. 1.
Figure 4D:
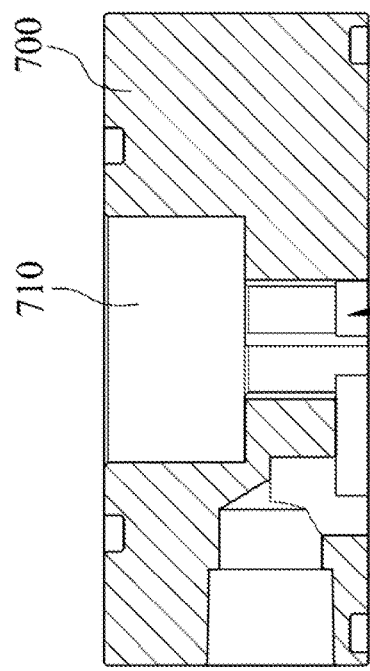
FIG. 4D is a schematic view of another embodiment of the body of the active compensating hydrostatic bearing of FIG. 1.
Figure 4A:
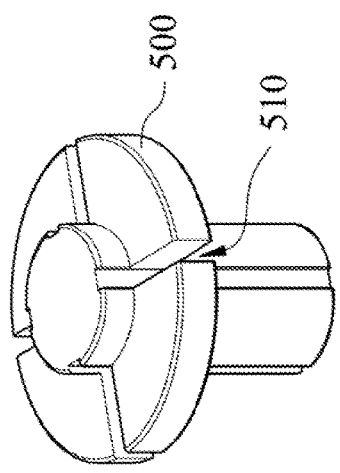
FIG. 4A is a schematic view of the groove of the active compensating hydrostatic bearing of FIG. 1.
Figure 4B:
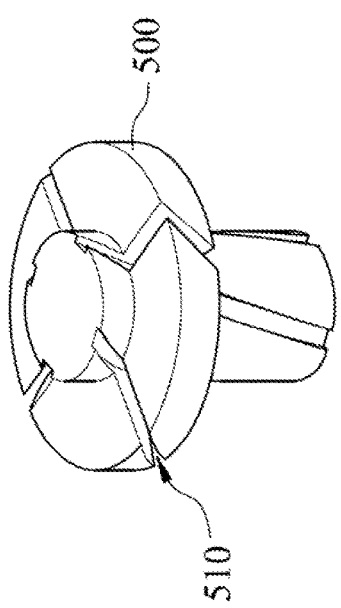
FIG. 4B is a schematic view of the groove of the active compensating hydrostatic bearing of FIG. 1.
Figure 5:
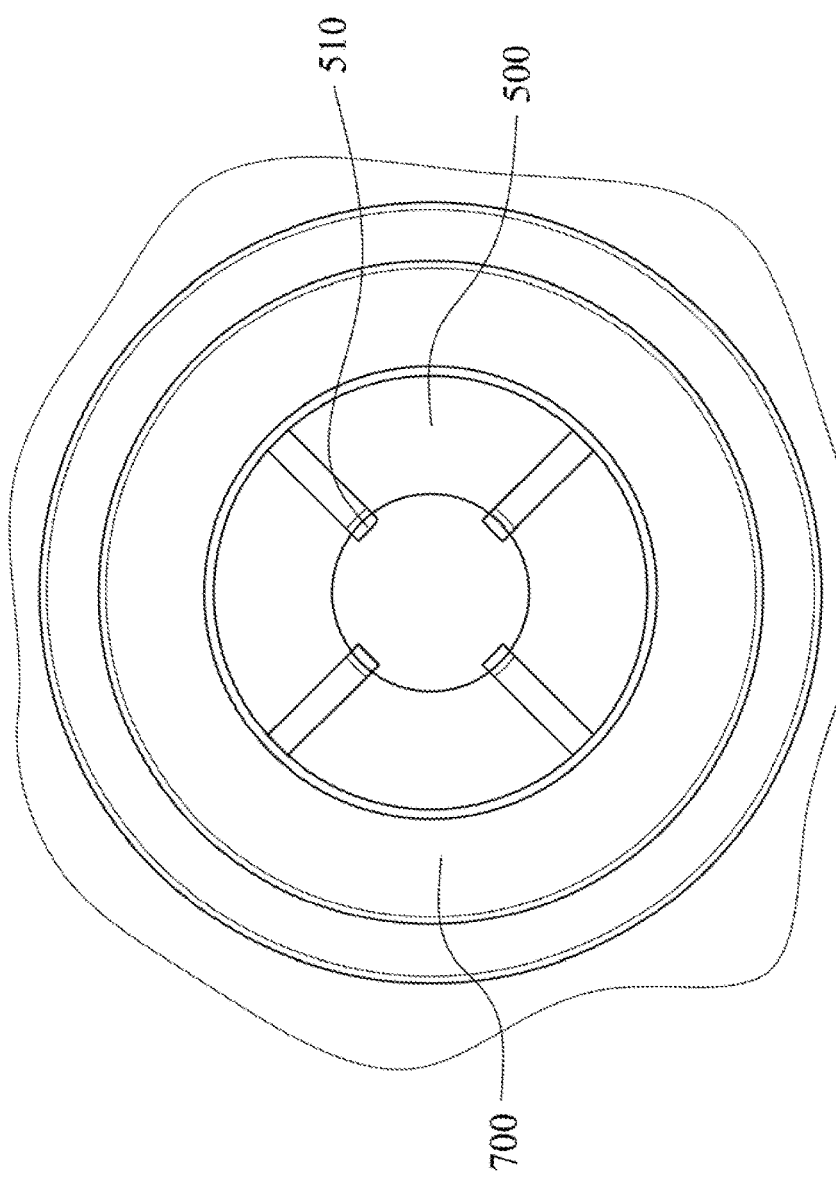
FIG. 5 is a top view of the sink of the active compensating hydrostatic bearing of FIG. 1.

FIG. 4A is a schematic view of the groove 510 of the active compensating hydrostatic bearing of FIG. 1. FIG. 4B is a schematic view of the groove 510 of the active compensating hydrostatic bearing of FIG. 1. FIG. 4C is a schematic view of one embodiment of the body 700 of the active compensating hydrostatic bearing of FIG. 1. FIG. 4D is a schematic view of another embodiment of the body 700 of the active compensating hydrostatic bearing of FIG. 1. FIG. 5 is a top view of the sink 710 of the active compensating hydrostatic bearing of FIG. 1.

Please refer to FIG. 4A, FIG. 4B, FIG. 4C, FIG. 4D and FIG. 5, the mass block 500 can include a plurality of grooves, and the body 700 can have different shapes according to the grooves.

The groove 510 and the body 700 can be straight as in FIGS. 4A and 4C, or can be spiral in FIG. 4B and FIG. 4D. The groove 510 can be disposed on the mass 500 symmetrically, but the shape and position are not limited herein.

In FIG. 5, the grooves 510 disposed on the mass block 500 speed up the compensation because compensation liquid will be infused into the sink 710 faster, so avoid decrease of rigidity of the active compensating hydrostatic regulator 100 when an external loading is changed. In addition, the symmetrical groove 510 can keep balance and without vibration caused by high pressure compensation liquid.

FIG. 6 is a schematic view of the compensation channel 820 of the active compensating hydrostatic bearing of FIG. 1. FIG. 7 is a schematic view of the bottom of the body 700 of the active compensating hydrostatic bearing of FIG. 1. In FIG. 6, the valve 800 includes a compensation channel 820 and a registration channel 830, and the compensation channel 820 passes through the registration channel 830.

In FIG. 7, the infusion channel 712 is disposed diagonally at the bottom of the body 700, and divided into two parts in the middle by the compensation hole 711. Therefore, the infusion hole 810 can align with the infusion channel 712 at two positions. In detail, when the valve 800 combines with the body 700, the compensation channel 820 is back to the infusion channel 712, so only the infusion hole 810 interconnects the infusion channel 712. In brief, the infusion hole 810 is disposed between the compensation hole 711 and the compensation channel 820.

FIG. 8 is a cross-sectional perspective view of the pad 900 of the active compensating hydrostatic bearing of FIG. 1. In FIG. 8, the body 700, the valve 800 and the pad 900 are penetrated at the centers, so compensation liquid in the sink 710 can be infused into the chamber 910.

Figure 9A:
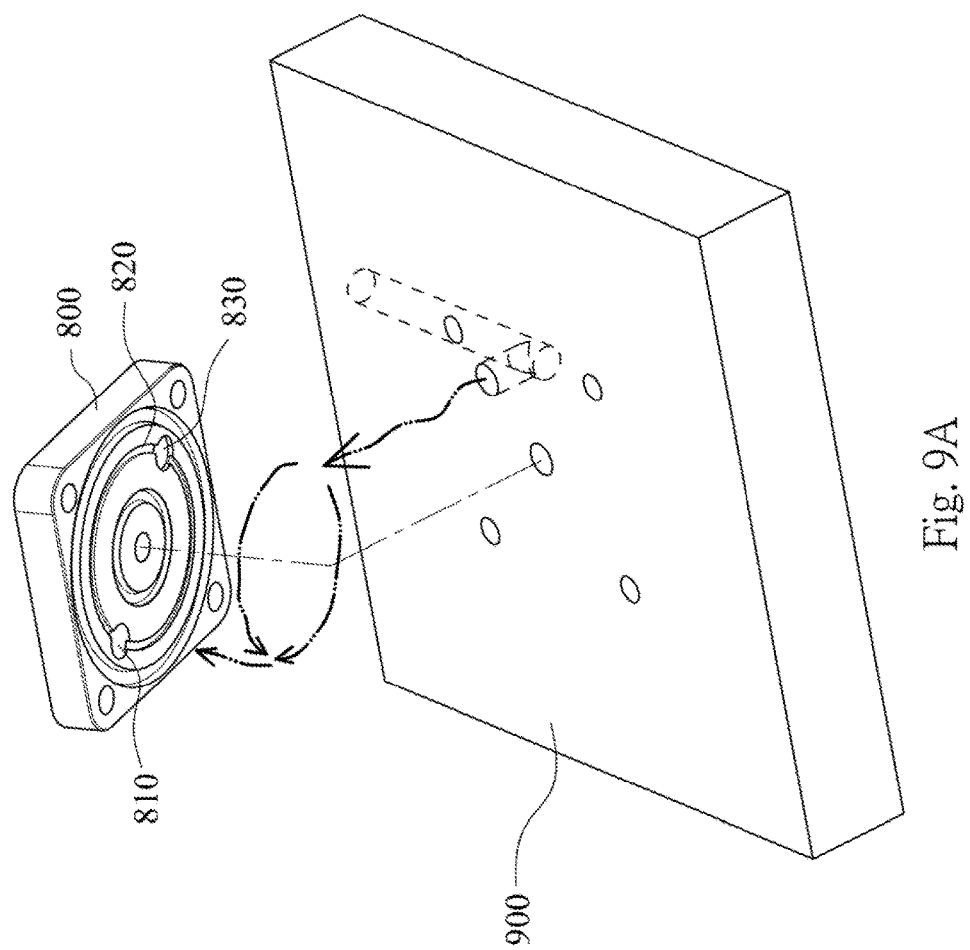
FIG. 9A is a schematic view of the flow path of the compensation channel of the active compensating hydrostatic bearing of FIG. 1.
Figure 9B:
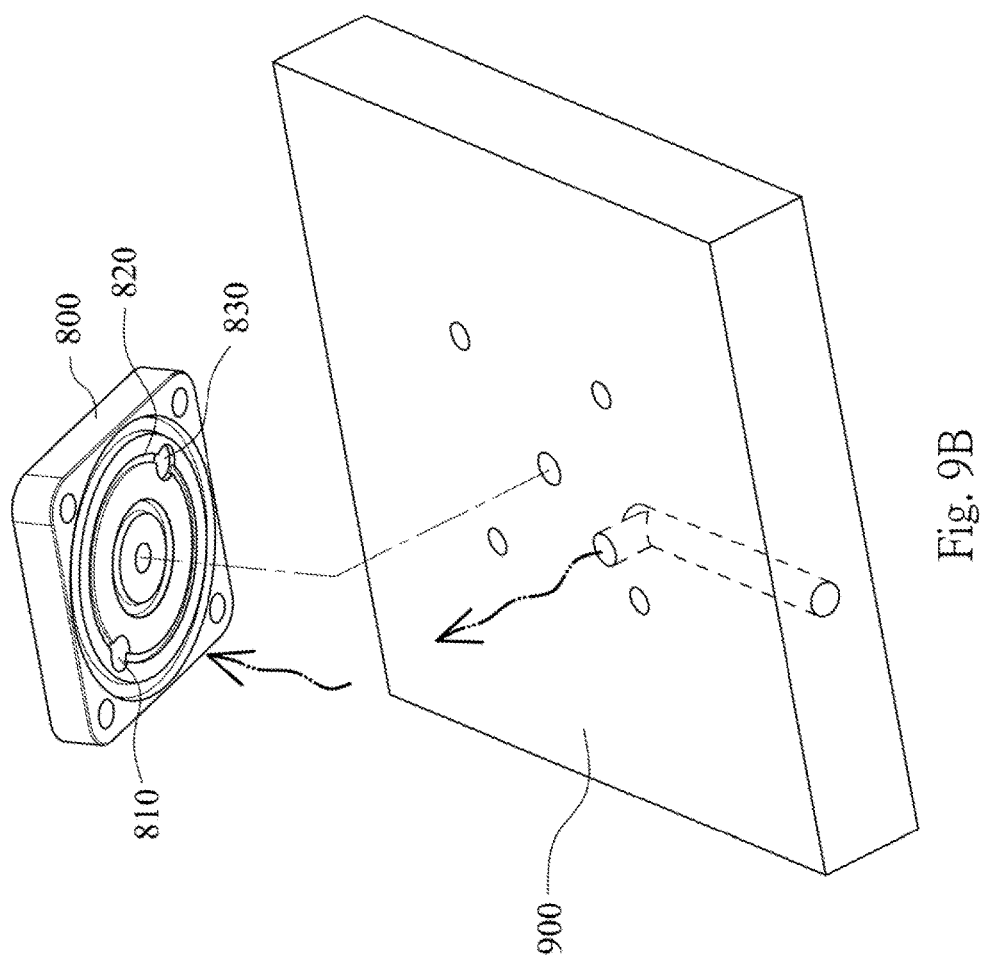
FIG. 9B is a schematic view of the flow path of the infusion hole of the active compensating hydrostatic bearing of FIG. 1.

FIG. 9A is a schematic view of the flow path of the compensation channel 820 of the active compensating hydrostatic bearing of FIG. 1. FIG. 9B is a schematic view of the flow path of the infusion hole 810 of the active compensating hydrostatic bearing of FIG. 1. Please refer to FIG. 9A and FIG. 9B, the infusion hole 810 and the infusion channel 712 keep alignment with each other, and the flow path of compensation liquid can be switched by the valve 800. More specifically, the valve 800 can select the registration channel 830 or the infusion hole 810 to align with the pad 900 for receiving compensation liquid, and the selection will decide whether the compensation channel 820 is used or not.

In FIG. 9A, the registration channel 830 is controlled to align with the source of compensation liquid of pad 900, and the infusion hole 810 at the other side is closed by the pad 900 (the valve 800 and the pad 900 are substantially combined). In this case, compensation liquid will be infused into the sink 710 through the registration channel 830, the compensation channel 820, the infusion hole 810 and the infusion channel 712 sequentially.

Conversely, in FIG. 9B, the body 700 and the valve 800 rotate 180 degrees, the infusion hole 810 is switched to align with the source of compensation liquid. A little compensation liquid will fill the compensation channel 820 and mostly be infused into the infusion channel 712 directly via the infusion hole 810.

The present disclosure utilizes resistance network method to monitor and compensate the mentioned routes of compensation liquid. Resistance network method controls inner pressure of active compensating hydrostatic bearing by viewing fluid as circuit. Controlling inner pressure by resistance network method is commonly used, so the details will not be described herein.

In brief, the flow resistances of compensation liquid at the compensation channel 820, the compensation gap h and the chamber 910 can be viewed as three electric resistances connected in series.

Hence, using the compensation channel 820 may be thought of connecting an electric resistance. In view of the principle of active compensating hydrostatic bearing, the rigidity of the bearing can be adjusted by the height of the compensation gap h. That is, the quality of controlling the compensation gap h can be considered as an indicator for stability of bearing.

To understand as electricity, using the compensation channel 820 means the influence of the flow resistance of the compensation gap h declined in the whole system, so can reduce the amount of adjustment of the flow resistance in accordance with variable an external loading. The feature moderates the amplitude of the compensation gap h, especially when an external loading is increased, the decrease of the rigidity of active compensating hydrostatic bearing will be smoothed to ensure stability.

In contrast, for faster compensation in the condition of under loading, switch to the infusion hole 810 is considerable. In view of the foregoing, infusing via the infusion hole 810 can speed up the compensation and gain the greater rigidity under low variation of loading.

As mentioned previously, the present disclosure uses double buffering mechanisms. Firstly, using the elastic members 600 to withstand an external loading and avoid decreasing of rigidity caused by sudden compression of the compensation gap h. Moreover, the elastic members 600 will reset continuously during the compression, so that to take the mass block 500 to the balanced position quickly. For the second, the valve 800 can smooth the compensation of the active compensating hydrostatic bearing, and be optional to the faster mode for different conditions.

According to another embodiment of the present disclosure, an active compensating hydrostatic regulator 100 is applied to an active compensating hydrostatic bearing, and includes a body 700, a valve 800 and a damping means, wherein the body 700 includes a compensation hole 711.

In FIG. 6 and FIG. 7, the valve 800 connects to the active compensating hydrostatic regulator 100, and includes an infusion hole 810 and a compensation channel 820. The infusion hole 810 and the compensation hole 711 are interconnected with each other, and the compensation channel 820 interconnects the infusion hole 810, wherein the infusion hole 810 can be disposed between the compensation hole 711 and the compensation channel 820. The valve 800 can rotate itself to switch to the infusion hole 810 or the compensation channel 820 for receiving compensation liquid and infuse into the active compensating hydrostatic regulator 100.

As shown in FIG. 6, the valve 800 can include a registration channel 830 disposed on the valve 800, and the infusion hole 810 and the registration channel 830 can be symmetric with respect to the rotating axis of the valve 800. That is, the infusion hole 810 and the registration channel 830 are 180 degrees of azimuth apart for easy to align with the source of compensation liquid.

The damping means withstands an external loading applied to the active compensating hydrostatic regulator 100. The damping means can be a elastic member 600 disposed in the active compensating hydrostatic regulator 100, such as a disk-shaped subject, a spring with high coefficient of elasticity, or an ebonite, but are not limited to the foregoing items.

By such arrangement, the active compensating hydrostatic regulator 100 can be modularized and applied to the active compensating hydrostatic bearing by adjusting the shape of the valve 800 or other members. Besides, each of the members can be replaced separately, this features is helpful to overcome the tolerance since the size of each member can be adjusted and match with each other.

According to the foregoing embodiments, the advantages of the present disclosure are described as follows. 1. By using the elastic member disposed in the body, the compensation gap can be controlled via the deformation of the elastic member. Thus, the inner pressure of the active compensating hydrostatic bearing can be adjusted automatically, so that the performance of rigidity of the hydrostatic bearing becomes more stable. Besides, the elastic member can support the mass block to avoid polarization or impaction. 2. The active compensating hydrostatic bearing is modularized that all of the parts can be replaced separately, the feature is helpful to overcome the problem of tolerance and convenient for maintenance. 3. By using the regulator, the user can switch the active compensating hydrostatic bearing to the compensation channel, so that can improve the stability and efficiency of machining. 4. The active compensating hydrostatic bearing, the pad and the regulator are integrated together so easy to install on difference machines. And, all of the interfaces between the mentioned members are kept sealed to avoid leakage. Moreover, the active compensating hydrostatic regulator of the present disclosure needn't use the external regulator, this makes the compensation mechanism response more quickly and solve the problem of delay.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An active compensating hydrostatic regulator, comprising:
    a body comprising a sink, wherein the sink comprises a compensation hole;
    a mass block disposed in the sink; and
    at least one elastic member disposed between the mass block and the compensation hole, the mass block and the compensation hole being departed by the elastic member thereby forming a compensation gap between the mass block and the compensation hole;
    wherein the elastic member withstands the mass block when the mass block is compressed for narrowing the compensation gap.

2. The active compensating hydrostatic regulator of claim 1, further comprising:
    a load member actuated by an external force to compress the mass block.

3. The active compensating hydrostatic regulator of claim 2, further comprising two elastic members, and the other elastic member is disposed between the mass block and the load member.

4. The active compensating hydrostatic regulator of claim 3, wherein each of the elastic members is disk-shaped and comprises a disk surface, and the two disk surfaces are faced toward the compensation hole and the load member respectively.

5. The active compensating hydrostatic regulator of claim 3, wherein shapes or sizes of the two elastic members are different.

6. The active compensating hydrostatic regulator of claim 2, wherein a ring is bound on the load member, and the sink is sealed by the load member and the ring.

7. The active compensating hydrostatic regulator of claim 2, further comprising:
    a lid covering the body; and
    an adjusting member passing through the lid and abutting the load member.

8. The active compensating hydrostatic regulator of claim 1, wherein the elastic member is disk-shaped and comprises a disk surface faced forward the compensation hole.

9. The active compensating hydrostatic regulator of claim 1, wherein a portion of the elastic member is hollow thereby allowing the mass block to be passed through.

10. The active compensating hydrostatic regulator of claim 1, wherein the mass block comprises at least one groove for flowing compensation liquid.

11. The active compensating hydrostatic regulator of claim 10, wherein the groove is straight or spiral.

12. The active compensating hydrostatic regulator of claim 1, further comprising:
    a pad adjacent to the body and having a chamber interconnected with the sink, an inner pressure of the sink is raised to against the mass block when the mass block is compressed.

13. The active compensating hydrostatic regulator of claim 1, wherein the mass block prepresses the elastic member and the elastic member comprises an initial compression.

14. The active compensating hydrostatic regulator of claim 13, wherein the rigidity of the elastic member is constant when the elastic member comprises the initial compression.

15. The active compensating hydrostatic regulator of claim 13, wherein the initial compression is smaller than 0.2 mm.

16. An active compensating hydrostatic bearing, comprising:
    a body comprising a sink, wherein the sink comprises a compensation hole;
    a mass block disposed in the sink;
    at least one elastic member disposed between the mass block and the sink, and the elastic member separates the mass block and the compensation hole by a compensation gap, the elastic member withstands the mass block when the mass block is compressed to narrow the compensation gap; and
    a valve adjacent to the body and having an infusion hole, the infusion hole being interconnected with the compensation hole, and the valve infuses compensation liquid into the sink via the infusion hole directly or indirectly.

17. The active compensating hydrostatic bearing of claim 16, further comprising:
    a load member actuated by an external force to compress the mass block.

18. The active compensating hydrostatic bearing of claim 17, further comprising two elastic members, and the other elastic member is disposed between the mass block and the load member.

19. The active compensating hydrostatic bearing of claim 18, wherein each of the elastic members is disk-shaped and comprises a disk surface, and the two disk surfaces are faced toward the compensation hole and the load member respectively.

20. The active compensating hydrostatic bearing of claim 18, wherein shapes or sizes of the two elastic members are different.

21. The active compensating hydrostatic bearing of claim 17, wherein a ring is bound on the load member, and the sink is sealed by the load member and the ring.

22. The active compensating hydrostatic bearing of claim 17, further comprising:
   a lid covering the body; and
   an adjusting member passing through the lid and abutting the load member.

23. The active compensating hydrostatic bearing of claim 16, wherein the elastic member is disk-shaped and comprises a disk surface faced forward compensation hole.

24. The active compensating hydrostatic bearing of claim 16, wherein the a portion of the elastic member is hollow thereby allowing the mass block to be passed through.

25. The active compensating hydrostatic bearing of claim 16, wherein the mass block comprises at least one groove for flowing compensation liquid.

26. The active compensating hydrostatic bearing of claim 25, wherein the groove is straight or spiral.

27. The active compensating hydrostatic bearing of claim 16, further comprising:
   a pad adjacent to the valve and having a chamber, the valve interconnected with the sink and the chamber, and an inner pressure of the sink rises to withstand the mass block when the mass block is compressed.

28. The active compensating hydrostatic bearing of claim 16, wherein the mass block prepresses and makes the elastic member with an initial compression.

29. The active compensating hydrostatic bearing of claim 28, wherein the rigidity of the elastic member is constant when the elastic member is within the initial compression.

30. The active compensating hydrostatic bearing of claim 28, wherein the initial compression is smaller than 0.2 mm.

31. The active compensating hydrostatic bearing of claim 16, wherein the valve has a compensation channel interconnected with the infusion hole, and the infusion hole is disposed between the compensation hole and the compensation channel.

32. The active compensating hydrostatic bearing of claim 31, further comprising:
   a valve switchable to align with the compensation channel and infuses compensation liquid into the infusion hole via the compensation channel.

33. The active compensating hydrostatic bearing of claim 31, further comprising:
   a valve switchable to align with the infusion hole and infuses compensation liquid into the sink via the infusion hole.

34. An active compensating hydrostatic regulator applying for an active compensating hydrostatic bearing, comprising:
   a compensation hole disposed on the active compensating hydrostatic regulator;
   a valve, comprising:
      an infusion hole interconnected with the compensation hole; and
      a compensation channel interconnected with the infusion hole; and
   a damping means for withstanding the external force applied to the active compensating hydrostatic regulator;
   wherein the valve is switchable to receive and infuse compensation liquid into the active compensating hydrostatic regulator via the infusion hole or the compensation channel.

35. The active compensating hydrostatic regulator of claim 34, wherein the infusion hole is disposed between the compensation hole and the compensation channel.

36. The active compensating hydrostatic regulator of claim 34, wherein the valve switches between the infusion hole and the compensation channel to receive compensation liquid by self-rotating.

37. The active compensating hydrostatic regulator of claim 36, further comprising:
   a registration channel passed by the compensation channel, and the registration channel and the infusion hole are symmetric with respect to the rotating axis of the valve.

* * * * *